US009200760B2

(12) United States Patent
Meyrenaud

(10) Patent No.: US 9,200,760 B2
(45) Date of Patent: Dec. 1, 2015

(54) LIGHTING AND/OR INDICATING DEVICE FOR A VEHICLE COMPRISING A LENS AND SOURCES

(71) Applicant: Valeo Vision, Bobigny Cedex (FR)

(72) Inventor: Jean-Luc Meyrenaud, Livry Gargan (FR)

(73) Assignee: Valeo Vision, Bobigny (FR)

(*) Notice: Subject to any disclaimer, the term of this patent is extended or adjusted under 35 U.S.C. 154(b) by 163 days.

(21) Appl. No.: 14/034,856

(22) Filed: Sep. 24, 2013

(65) Prior Publication Data

US 2014/0085920 A1 Mar. 27, 2014

(30) Foreign Application Priority Data

Sep. 25, 2012 (FR) ..................................... 12 58970

(51) Int. Cl.

*B60Q 1/04* (2006.01)
*F21K 99/00* (2010.01)
*F21S 8/10* (2006.01)

(52) U.S. Cl.

CPC ............... *F21K 9/50* (2013.01); *F21S 48/1154* (2013.01); *F21S 48/1266* (2013.01); *F21S 48/1275* (2013.01); *F21S 48/1747* (2013.01)

(58) Field of Classification Search

CPC .............. F21S 48/1154; F21S 48/1747; F21S 48/1266; F21S 48/215; F21S 48/1275; B60Q 1/2696; B60Q 1/18; B60Q 1/04; F21K 99/00; F21K 9/50

USPC ............. 362/249.12, 311.01, 311.02, 311.08, 362/543, 545

See application file for complete search history.

(56) References Cited

U.S. PATENT DOCUMENTS

| | | | | |
|---|---|---|---|---|
| 7,029,155 | B2 | 4/2006 | Bos et al. | |
| 7,645,062 | B2 | 1/2010 | Yatsuda et al. | |
| 8,506,147 | B2 | 8/2013 | Yatsuda et al. | |
| 2004/0136200 | A1 | 7/2004 | Bos et al. | |
| 2005/0041434 | A1 | 2/2005 | Yatsuda et al. | |
| 2010/0315828 | A1 | 12/2010 | Yatsuda et al. | |
| 2011/0080753 | A1 * | 4/2011 | Hering et al. | 362/545 |
| 2011/0235349 | A1 * | 9/2011 | Nakaya et al. | 362/543 |

FOREIGN PATENT DOCUMENTS

| | | |
|---|---|---|
| DE | 202010001654 | 5/2010 |
| EP | 2280215 | 2/2011 |
| FR | 2849156 | 6/2004 |

* cited by examiner

*Primary Examiner* — Y M Lee
(74) *Attorney, Agent, or Firm* — Jacox, Meckstroth & Jenkins

(57) ABSTRACT

An optical module, in particular for a lighting and/or indicating device for a vehicle, comprises a lens, at least two light sources, in particular two LEDs, arranged facing the same face of the lens, and means for controlling the lighting-up of at least one of the sources independently of the other.

16 Claims, 3 Drawing Sheets

LIGHTING AND/OR INDICATING DEVICE FOR A VEHICLE COMPRISING A LENS AND SOURCES

CROSS-REFERENCE TO RELATED APPLICATIONS

This application claims priority to French Application No. 1258970 filed Sep. 25, 2012.

BACKGROUND OF THE INVENTION

1. Field of the Invention

The invention relates to lighting and/or indicating devices for motor vehicles.

2. Description of the Related Art

There is known from document FR-2 849 156, which is equivalent to U.S. Publication No. 2004/0136200 and to U.S. Pat. No. 7,029,155, a headlamp capable of producing, selectively, a high beam or a daytime running beam, and this is achieved using the same light source and the same lens. The source is formed by a filament lamp or a discharge lamp. The headlamp is equipped with a filter moveably fitted between a position in which it intercepts the light rays of the source and a position in which it leaves them free. Therefore, two different beams are obtained by means of the same optical unit.

However, it is preferred to avoid equipping the headlamp with such a mechanism, which can pose difficulties relating to assembly, adjustment and longevity. Furthermore, this mechanism is expensive and makes the device bulky.

SUMMARY OF THE INVENTION

An aim of the invention is to produce two types of beams by means of one device without resorting to such a mechanism for transitioning from one beam to the other.

To this end, provision is made according to the invention for an optical module, in particular for a lighting and/or indicating device for a vehicle, which comprises:

- a lens,
- at least two light sources, in particular two LEDs, arranged facing the same face of the lens, and
- means for controlling the lighting-up of at least one of the sources independently of the other.

Thus, it is by choosing the configuration for lighting up the sources (for example, lighting up one source, or the other, or both) that the beam produced by the module is determined. The LEDs enable the module to be produced in a compact and economical form. The module need not be equipped with a mechanism for changing the beam, thereby avoiding the associated problems of assembly, adjustment and longevity.

Preferably, at least one of the light sources exhibits a light emission axis, this axis passing through the lens.

Preferably, at least one of the light sources is arranged in such a way that the beam which it emits enters the lens directly.

Advantageously, at least one of the sources is located at a focus of the lens.

Advantageously, the lens exhibits a line of foci on which the sources are located.

Preferably, the lens exhibits a light output face having an elliptical-shaped cross section in at least one vertical plane.

Thus, by arranging one or more of the sources in the vicinity of one of the foci of the ellipse, the light rays are urged to leave the lens in horizontal planes.

Preferably, the lens exhibits a light output face having an elliptical-shaped cross section in several vertical planes parallel with each other.

Provision can be made for the module to be arranged in order to produce by means of the lens a beam suitable for forming a part of a regulatory beam with a cutoff.

Provision can also be made for the module to be arranged to produce the beam suitable for forming a part of a regulatory beam with a cutoff by means of one of the sources, the other source or sources being off.

Advantageously, the module is arranged to produce by means of the lens a beam suitable for forming a part, in particular the whole part, of a regulatory beam not exhibiting a cutoff, in particular a daytime running beam.

In one embodiment, the module is arranged to produce a single beam by means of all the sources.

Advantageously, it is arranged to produce by means of the lens two different light beams.

Provision can be made for one of the beams to be suitable for forming a part of a beam with a cutoff, for example, a low beam, a high beam or a fog beam.

Provision can also be made for one of the beams to not exhibit a cutoff, and to form, for example, a daytime running beam, or DRL (Daytime Running Light).

Preferably, the module comprises means for choosing an electrical current supply voltage for at least one of the sources from among two non-zero values.

Thus, there is the option of supplying this source with a relatively high voltage when this source is used without the others being lit up or is used with a reduced number of other sources. Conversely, when this source is used with all the other sources or with a large number of sources, its supply voltage can be reduced in order to obtain a better distribution of light.

Provision can be made for the module to comprise a mask suitable for forming a cutoff in a beam produced by means of the lens.

In one embodiment, there are two lenses, each of which is suitable for producing a beam.

They can be formed by a single part, one combined with the other, or in the form of separate parts.

Provision can be made for there to be at least three sources, associated specifically with the or each lens.

Provision can also be made according to the invention for a lighting and/or indicating device for a vehicle, which includes a first optical module according to the invention.

Advantageously, the device further comprises at least a second module arranged to produce a beam completing a beam produced by means of the first module in order to form a beam with a cutoff.

Provision can be made for the device to form a lighting device, an indicating device or both at the same time.

Other features and advantages of the invention will become clearer from the following description of several embodiments given by way of nonlimiting examples with reference to the accompanying drawings in which:

BRIEF DESCRIPTION OF THE ACCOMPANYING DRAWINGS

DETAILED DESCRIPTION OF THE PREFERRED EMBODIMENTS

FIGS. 1 to 4 illustrate a lighting device for a motor vehicle according to one embodiment of the invention.

Hereafter, the orthogonal reference X, Y, Z is used in which the direction Z is vertical and the directions X and Y are horizontal, the direction X being parallel to the direction of travel of the vehicle.

The device 2 includes a base module which comprises a single lens 4 and light sources formed by LEDs 6, 8, 10, 12, 14, 16. In this case, there are six LEDs, but this number is not restricted. There could also be two, three, four, five or more than six.

The lens 4 has two planes of median symmetry, which are parallel to the directions X and Y and to the directions X and Z respectively.

It has a flat vertical rear face 18 perpendicular to the direction X which forms an input face for the light from the diodes.

Figure 1:
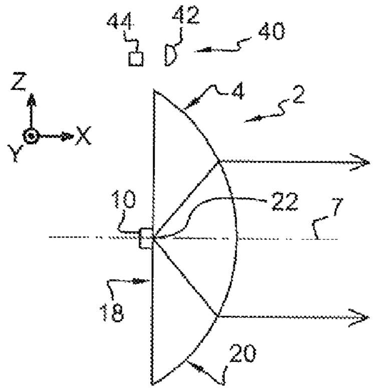
FIGS. 1 to 3 are views from the side, from above and from the rear, respectively, of a device according to one embodiment of the invention.
Figure 2:
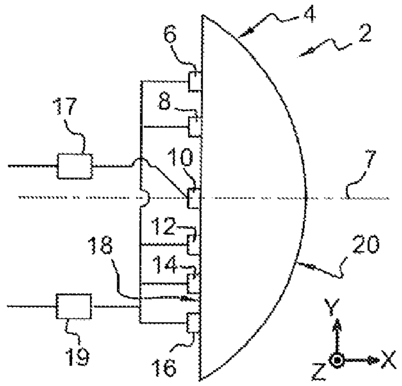

It has a vertical front face 20 which has an elliptical shape in the vertical cross sections taken in the planes parallel to the directions X and Z, as illustrated in FIG. 1. The focus 22 of the two foci of the ellipse which is the closer one to the face 20 is located on the face 18. The lens 4 thus comprises a line of foci parallel to the direction Y and located in its horizontal median plane. This elliptical shape which is the same in all the cross sections bears on a curve which forms the cross section of the lens 4 in its horizontal median plane. This cross section can be formed in various shapes depending on the beams which the device 2 must produce. In this particular case, a parabolic shape is employed. But an elliptical shape could also be used. The elliptical shape of the vertical cross section provides for orienting the light rays emerging from the lens 4 into horizontal planes or giving them a slightly inclined direction relative to the horizontal direction.

All the sources or LEDs 6, 8, 10, 12, 14, 16 are aligned in a straight line merged with the line of foci and which is marked out in the face 18. Each of the sources or LEDs 6, 8, 10, 12, 14, 16 are therefore located at the aforementioned focus of the corresponding vertical cross section of the face 20. All have their emitting face in surface contact with the face 18 such that the latter receives the light from each of the LEDs 6, 8, 10, 12, 14, 16. In the present example, the source or LED 10 is located on the optical axis 7. The two sources or LEDs 6 and 8 are located in the lefthand part of the lens 4 while the other three sources or LEDs 12, 14 and 16 are located in its righthand part. Of course other arrangements of sources or LEDs can be considered.

Figure 3:
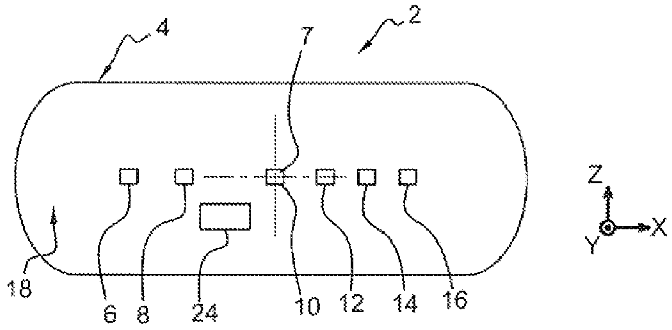
Figure 4:
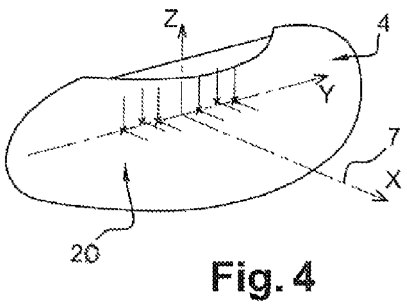
FIG. 4 is a perspective view of the lens of the device of the preceding drawings.

Depending on the types of beam that it is designed to form with the device 2, provision can be made, as illustrated as a variant in FIG. 3, for installing a flat mask 24 against the face 18 such that one edge of the mask 24 forms a cutoff for the beam or beams produced by the device 2. However, the use of such a mask 24 is not mandatory to produce a beam exhibiting a cutoff. In other words, it is possible to produce such a beam by suitably positioning the LEDs 6, 8, 10, 12, 14, 16, without using a mask 24.

The base module comprises control means 17 for lighting up the LED 10 and control means 19 for lighting up the other LEDs, common to the latter. It is therefore possible to selectively light up only the LED 10, the other LEDs remaining off, or to light up all the LEDs at the same time.

Additionally, the control means 17 are configured to allow the electrical current supply voltage for the LED 10 to be chosen from two non-zero values that are different from one another.

The device 2 further comprises at least one complementary module 40 as illustrated in FIG. 1. This module 40 is completely separate from the base module. It comprises means for producing a light beam independent of the beam produced by the base module. These means comprise for example at least one lens 42 and at least one light source 44 such as an LED. The purpose of this module 40 is to produce a beam which arrives at completing a beam emitted by the base module in order to obtain the desired regulatory beam.

Figure 5:
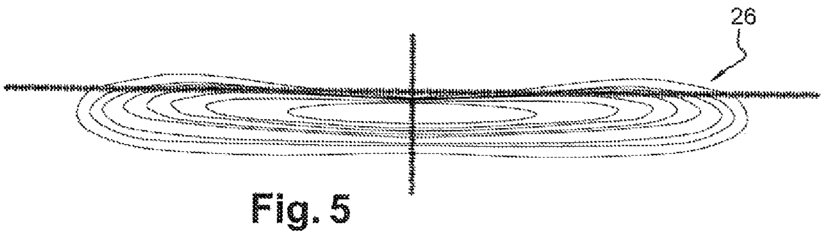
FIGS. 5 and 6 illustrate the two beams that can be produced by the device of the preceding drawings, as they appear on a screen.
Figure 6:
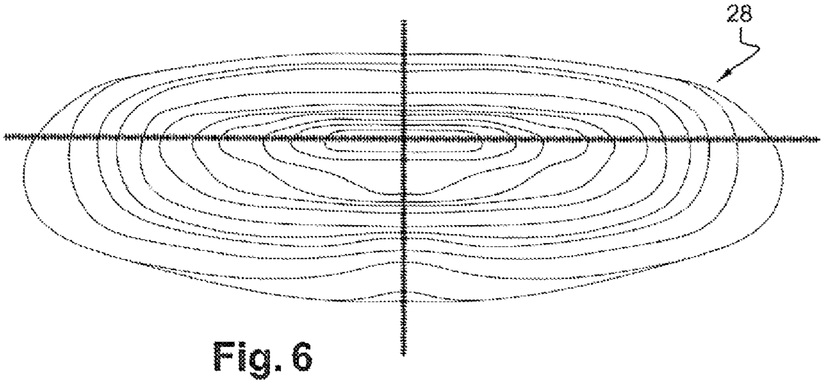
Figure 7:
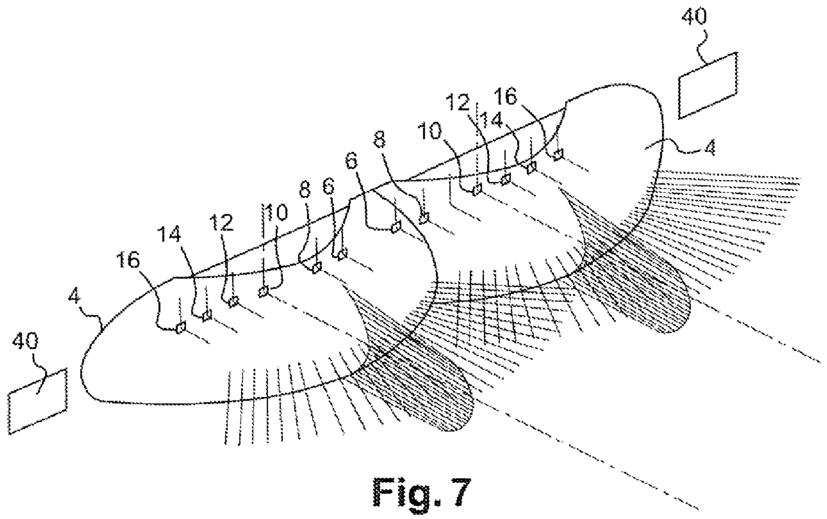
FIG. 7 is a view similar to that of FIG. 4 showing another embodiment of the device of the invention.

The base module is in this particular case suitable for selectively producing two beams 26, 28 illustrated in FIGS. 5 and 6 respectively, as they appear on a flat vertical screen perpendicular to the direction X, arranged in front of the device 2.

The beam 26 is a flat beam or low beam. It is observed that the device 2 sends little or no light above the horizontal line representing the horizon and in particular no light in the part of this line which is close to the center of the reference. This beam 26 is formed by lighting up only the source 10, the other LEDs of the device being off. The supply voltage for this source is then given its highest value.

The device 2 is arranged such that the beam 26 of the base module and that of the complementary module 40 complete each other to form a beam with a cutoff. For example, this may be a low beam, a high beam or a fog beam. Thus, to produce the low beam, one or more complementary modules 40 complete the beam 26 in the top righthand part of the screen. To produce the high beam, one or more complementary modules 40 complete the beam 26 in the top lefthand and top righthand parts of the screen. The fog beam is produced in a similar manner.

The other beam 28 is in this particular case a beam which does not exhibit a cutoff. Here, this is a daytime running beam. It is produced by simultaneously lighting up all the LEDs of the base module. It is observed that the beam extends as much below the horizontal axis representing the horizon line as above it, unlike the beam 26. The supply voltage for the source 10 is then given its lower value from among the two previously-mentioned non-zero values. This beam 28 is produced by means of the base module only, without using the complementary module 40 which is off.

The device 2 according to the invention provides for giving the central LED 10 an efficiency of between 60% and 70% for example, which is relatively high. It also provides for making the base module exhibit substantially the same appearance for the observer, whether it produces a beam with a cutoff or a daytime running beam.

A second embodiment of the device 2 is illustrated in FIGS. 7 to 10. This time, the device 2 comprises not one but two lenses 4, distinct from one another but formed by a single part, one combined with the other, in the present example. The device 2 also comprises one group of LEDs associated specifically with one of the lenses 4 and another group of LEDs associated specifically with the other lens 4. Therefore, this time it comprises two base modules, each module comprising one of the lenses 4 and one of the groups of LEDs. Each base module is furthermore configured in the same way as the base module of the device of FIGS. 1 to 4. In particular, it comprises the same number of LEDs as the module of the first embodiment, this nevertheless not being mandatory.

Figure 8:
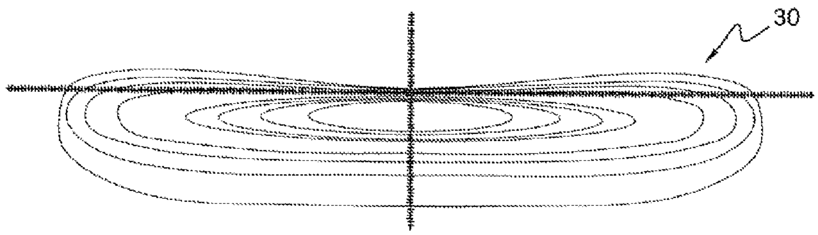
FIGS. 8 to 10 are views similar to those of FIGS. 5 and 6 showing beams produced by the device of FIG. 7.
Figure 9:
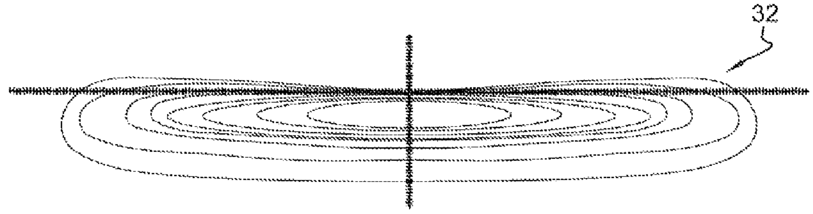

These two base modules, and in particular the two lenses 4, are arranged so as to alone produce beams 30 and 32 respectively which can be different from each other and which are illustrated in FIGS. 8 and 9. The difference between the beams 30, 32 can be achieved in particular by providing the two lenses 4 with different focal distances from one another. As previously, these two beams 30, 32 are obtained by lighting up only the central diode 10 in each base module. There are two flat or low beams.

The device 2 again comprises one or more complementary modules 40 supplying one or more beams forming, in combination with the beams 30 and 32, a beam with a cutoff such as a low beam, a high beam or a fog beam as is the particular case here. This regulatory beam is therefore formed in particular by the addition of beams 30 and 32.

Figure 10:
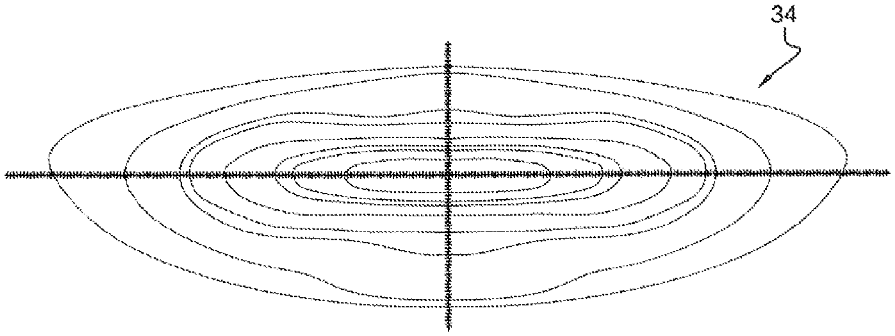

The device 2 is further arranged such that the two base modules used in combination and without the complementary module or modules 40 produce a beam 34 illustrated in FIG. 10. This is a beam without a cutoff which in this particular case is a daytime running beam. This time, all the LEDs of each of the base modules are lit up, the LEDs 10 being supplied with the lower among the two possible voltages. The complementary module or modules are off.

In each of these embodiments, when the aim is to produce a daytime running beam, the input face of the lens will be given a sufficient surface area, for example 24 $cm^2$, in order to obtain the regulatory photometry for this type of beam.

Of course, a number of modifications can be introduced to the invention without departing from the scope thereof.

In the second embodiment, the two lenses may be produced as separate parts.

By using one or more LEDs, each capable of producing beams of different colors, the invention can be set up to obtain an indicating device such as a direction indicator.

Furthermore, whether the device forms an indicating device and/or a lighting device, it can exhibit one or more lighting and/or indicating functions other than those implemented with the invention, these functions being realized by one or more modules independent of the abovementioned modules.

Control means can be provided, suitable for controlling the lighting-up of one group of LEDs independently of the other group of LEDs or of one of the other groups of LEDs. Individual control means for each LED can also be provided.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

What is claimed is:

1. An optical module, in particular for a lighting and/or indicating device for a vehicle, wherein the optical module comprises:

a lens;

at least two light sources, in particular two LEDs, arranged facing a same face of said lens; and means for controlling the lighting-up of at least one of said at least two light sources independently of the other;

wherein said lens exhibits a line of foci on which said at least two light sources are located.

2. The optical module according to claim 1, in which said at least one of said at least two light sources exhibits a light emission axis, said light emission axis passing through said lens.

3. The optical module according to claim 1, wherein said at least one of said at least two light sources is arranged in such a way that a beam which it emits enters said lens directly.

4. The optical module according to claim 1, wherein said at least one of said at least two light sources is located at a focus of said lens.

5. The optical module according to claim 1, wherein said optical module is arranged to produce by means of said lens a beam suitable for forming a part of a regulatory beam with a cutoff.

6. The optical module according to claim 5, wherein said optical module is arranged to produce said beam suitable for forming a part of a regulatory beam with a cutoff by means of one of said at least two light sources, the other source or sources being off.

7. The optical module according to claim 1, wherein said optical module is arranged to produce by means of said lens a beam suitable for forming a part, in particular a whole part, of a regulatory beam not exhibiting a cutoff, in particular a daytime running beam.

8. The optical module according to claim 7, wherein said optical module is arranged to produce said beam suitable for forming a part, in particular said whole part, of a regulatory beam not exhibiting a cutoff, by means of all of said at least two light sources.

9. The optical module according to claim 1, wherein said optical module is arranged to produce by means of said lens two different light beams.

10. The optical module according to claim 1, wherein said optical module comprises means for choosing an electrical current supply voltage for said at least one of said at least two light sources from among two non-zero values.

11. The optical module according to claim 1, wherein said optical module comprises a mask suitable for forming a cutoff in a beam produced by means of said lens.

12. The optical module according to claim 1, wherein there are two lenses, each of which is suitable for producing a beam.

13. A lighting and/or indicating device for a vehicle, wherein said lighting and/or indicating device includes a first optical module according to claim 1.

14. The lighting and/or indicating device according to claim 13, wherein said lighting and/or indicating device further comprises at least a second module arranged to produce a beam completing a beam produced by means of said first optical module in order to form a beam with a cutoff.

15. An optical module, in particular for a lighting and/or indicating device for a vehicle, wherein the optical module comprises:

a lens;

at least two light sources, in particular two LEDs, arranged facing a same face of said lens; and means for controlling the lighting-up of at least one of said at least two light sources independently of the other;

wherein said lens exhibits a light output face having an elliptical-shaped cross section in at least one vertical plane.

16. An optical module, in particular for a lighting and/or indicating device for a vehicle, wherein the optical module comprises:

a lens;

at least two light sources, in particular two LEDs, arranged facing a same face of said lens; and means for controlling the lighting-up of at least one of said at least two light sources independently of the other;

wherein said lens exhibits a light output face having an elliptical-shaped cross section in several vertical planes parallel with each other.

* * * * *